United States Patent Office 3,137,927
Patented June 23, 1964

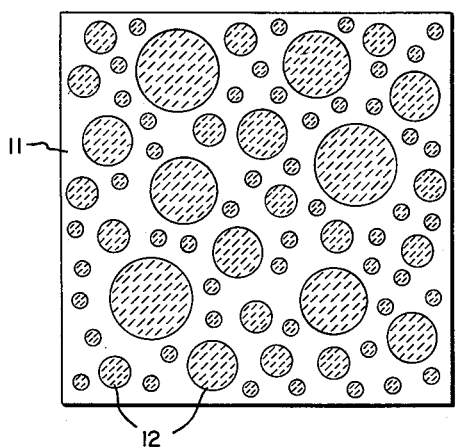
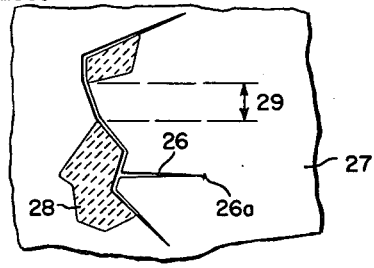
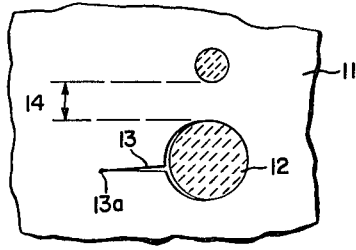
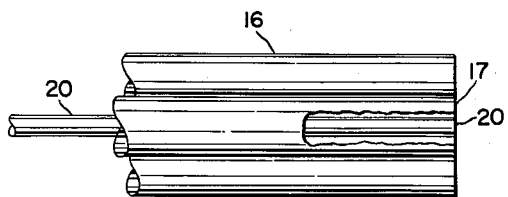
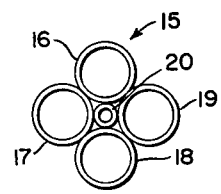
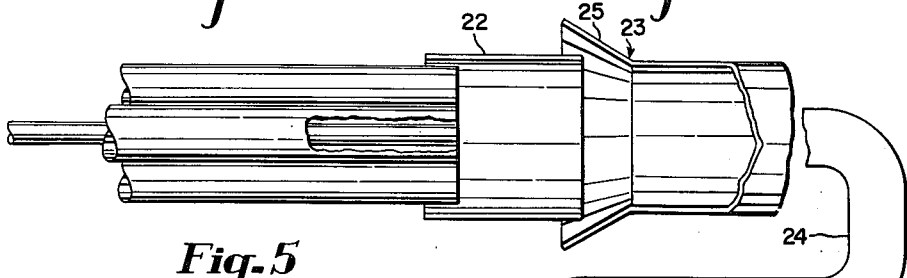
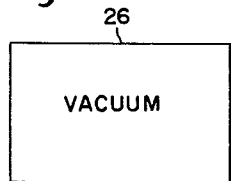
INVENTORS
FRANCIS J. HUEGEL
CHOH H. LI
BY *Frederick E. Lange*
ATTORNEY

3,137,927
DISPERSION HARDENED MATERIALS
Francis J. Huegel, Middletown, Conn., and Choh H. Li, Hopkins, Minn., assignors to Minneapolis-Honeywell Regulator Company, Minneapolis, Minn., a corporation of Delaware
Filed July 13, 1960, Ser. No. 42,542
2 Claims. (Cl. 29—182.5)

This application is a continuation-in-part of our pending application, Serial No. 705,207, filed December 26, 1957, now abandoned, for Dispersion Hardened Materials.

The present application relates to a process for preparing dispersion hardened or cermet bodies and the bodies prepared thereby. Specifically, this invention relates to the preparation of improved cermet bodies having ductile characteristics and having relatively high impact strength, and furthermore, materials of this type which lack the objectionable brittle characteristics for which these substances are known, but retain the desirable high strength properties at high temperatures.

In the past, it has been the practice to prepare cermet bodies having a metal matrix which has been dispersion hardened with a charge of hard material which is normally incompatible with the matrix substance even at elevated temperatures. In this connection, there has been no attempt previously to control the physical shape or form of the hard substance used in these applications. According to the present invention, the hard substance has an essentially spherical shape and controlled size, and as a result of the careful selection of the hard filler material, ductile cermets having a high impact strength may be prepared. The volume percent of the hard substance may also be increased up to about 95% by volume without adversely affecting the physical properties of the finished product. While "cermets" have become known in the art today as dispersion hardened bodies having a metallic or matrix phase together with nonmetallic impregnate or hard phase dispersed therethrough, the impregnate being included in an amount exceeding 30% by volume of the mixture, it will be appreciated that somewhat lower volume percentages of impregnate may be utilized without departing from the teaching of the present invention.

It is therefore an object of the present invention to prepare ductile, dispersion hardened cermet bodies having unusually high impact strength and which are adapted to employ a relatively large charge of hard, incompatible filler.

It is a further object of the present invention to prepare cermet bodies with a hard phase dispersed therethrough having a preferred size and shape.

It is still a further object of the present invention to prepare cermets employing spherically shaped hard phase filler substance.

Other and further objects of the present invention will become apparent upon a study of the following specification, claims, and accompanying drawings, wherein:

FIGURE 1 is a diagrammatic representation of a body prepared in accordance with the invention;

FIGURE 2a is a schematic representation of the propagation of the crack originating in the matrix metal and progressing through a cermet body containing irregularly shaped particles;

FIGURE 2b is a schematic representation of a crack originating in a matrix metal of the cermet body prepared in accordance with invention having spherical particles;

FIGURE 3 is a side view of apparatus employed to spheroidize the impregnate or filler substance;

FIGURE 4 is a front view of the apparatus shown in FIGURE 3;

FIGURE 5 is a schematic view showing an arrangement for spheroidizing hard refractory type substances employing the device shown in FIGURES 3 and 4.

According to the preferred process of the present invention, a hard refractory substance such as alumina is spheroidized and classified according to the particle size. Those particles falling below about 50 microns in diameter are selected and employed in the subsequent steps of the invention. The hard refractory material is then impregnated into a metallic matrix, the powder either being added to the molten metal material or sintered therewith after being premixed with the powder metal matrix. Conventional metal forming techniques may then be utilized, such as cold rolling or the like. Since the cermet material may work harden depending upon the characteristics of the metallic materials employed, it may be necessary to anneal the material to relieve the internal stresses developed after such a rolling operation.

When randomly shaped filler substances are utilized, the dispersion hardening which occurs in the metal matrix causes the composite arrangement to be extremely brittle and to have extremely low impact strength. We have found that our process produces cermet bodies having greatly improved impact strength, and these materials are highly ductile and may be readily formed into other physical shapes. In addition, the volume ratio of hard substance in cermet bodies has previously been limited to about 20% in order to retain desirable formability characteristics; however, when these bodies are prepared according to the present invention, the volume ratio may be increased up to about 95%. In conventional cermets using randomly shaped filler particles, it has been found that an attempt to reduce the thickness of a slug of the material by cold rolling results in cracks which render the finished product unusable. In the past, this difficulty has been dealt with by doing all rolling operations at elevated temperatures to permit reduction in thicknesses of cermet materials. Unless an elevated temperature is used with a randomly shaped particle filled cermets, cracking will inevitably render the finished product unusable. Cermets prepared in accordance with the present invention may be cold rolled at room temperatures to reduce thickness without developing cracks as do cermets made with irregularly shaped particles. As noted above, it may be necessary during the reducing process to anneal the metallic matrix to relieve the work hardening. However, the distinction between cermet bodies prepared in accordance with the invention and the matrix metal used in the cermet is not as marked as to its cold rolling properties as is the case in cermets known before. That is, the cermet of the present invention more closely conforms to the overall rolling properties of the pure matrix metal than do the cermets using randomly shaped particles.

Hard insoluble materials which may be employed are alumina, mullite, zircon, fosterite, and hard intermetallics such as $TiAl_3$ or the like. A matrix metal may be conveniently selected from the group consisting of aluminum, titanium, nickel, copper, chromium, iron, and their various alloys. Pure metals or low alloy metals may be employed depending on the wettability desired. Titanium metal aids the wetting of the hard phase by the metal matrix substance. The hard phases and the matrix substances are well known and are conventional in the art today. It is also well known in the art that titanium metal aids in the wetting of ceramic substances by other metals. Upon completion of the preparation of the cermet bodies, a material such as illustrated in FIGURE 1 is formed.

FIGURE 1 is a diagrammatic representation of a cross section of a cermet generally designated 10 prepared in accordance with the invention. This diagrammatic representation shows a sectioned view of approximately 50% by volume ceramic filled matrix metal 11 wherein the ceramic particles 12 are essentially spherical in form and range from 1 to 5 microns in diameter. It has been found that for purposes of the invention, particles must be below about 50 microns in diameter to achieve the desired effect. In the preferred form of the invention, the particles will range from 1 micron to 5 microns in diameter.

FIGURE 2a is a schematic representation of the propagation of a crack originating in the matrix metal of a cermet material made utilizing randomly shaped particles. As can be seen, a crack 26 originating at a point 26a in the matrix metal 27 proceeds through the matrix metal until it comes in contact with a hard phase, irregularly shaped ceramic material 28. Upon contacting the hard phase material, the crack is propagated along the surface of the hard phase until it reaches an interparticle zone identified 29. The shear stresses existing in the matrix metal zone identified 29 are essentially zero and the crack thus propagates across the matrix metal to the next ceramic particle and so on. Thus, it can be seen that the crack originating in the matrix metal in a conventional cermet is easily propagated through the matrix metal along the surfaces of the ceramic particles. This is believed to account for the lack of ductility and extreme brittleness of conventional cermet materials.

FIGURE 2b is a schematic representation of the propagation of a crack originating at a dislocation in the matrix metal of a cermet made in accordance with the present invention. The crack 13 originating at 13a proceeds through the matrix metal until it comes in contact with a spherically shaped ceramic particle 12, wherein it proceeds along the surface of the ceramic particle until it reaches an interparticle zone 14 of the matrix metal. The shear stress in the matrix metal zone 14 is thus made maximum and the matrix metal is allowed to flow and thus absorb the shear stress. Thus, the spherical particles provide a means for termination of cracks originating in the matrix metal by relief of the stresses existing between particles in a cermet material, and a cermet having superior properties to cermets conventionally formed has been achieved.

Reference is now made to FIGURES 3, 4, and 5 wherein there is shown an apparatus for spheroidizing the hard substance which is employed in the present invention. A nest of oxy-acetylene torches generally designated at 15 which include torches 16, 17, 18, and 19 surrounds and encompasses the refractory feed tube 20 which terminates just short of the tips of the torches. This arrangement is placed in a suitable enclosure and is bounded by a baffle 22 which directs the flow of flame and materials to the collecting funnel arrangement generally designated at 23. The collecting arrangement 23 employs a collecting tube 24 which extends from the entrance portion 25 to a vacuum discharge and retaining receptacle 26. In operation, the randomly formed refractory bodies are blasted through the conduit 20 into the open flame which is formed at the end of the torches 15. Upon emerging from the feed conduit, they are heated to a temperature in excess of the melting temperature of the refractory substance and due to the surface tension characteristics thereof, spherical shaped particles are formed. These particles, after a suitable size classification, are ready for use in the cermet body.

*Example I*

Alumina powder having a size which is under about 50 microns is passed through the spheroidizing operation and is converted to optically transparent sapphire phase alumina spheres. These particles are then incorporated into metallic matrix which consists of 99.5% copper and 0.5% titanium. The spheres may comprise from about 20% up to about 95% by volume of the resulting cermet. The technique of adding these spheres in the metal to form a homogeneous mixture is dependent to some extent upon the volume which the hard phase occupies. For example, when the hard phase comprises greater than 75% by volume of the resulting cermet, a more uniform product will result if the cermet powder is placed into a suitable mold and a slug of the copper alloy is placed on top of the powder to be impregnated. The copper alloy is then liquified by heating and percolates through the hard phase material to form a homogeneous end product of the metal phase and the ceramic phase. It has been found that segregation of the particles is less likely to occur under the circumstances and voids within the mass material due to a lack of wetting by the metal phase is also less likely to occur. In the event the hard phase comprises less than 50% of the total mixture, the problem of wetting and voids within the resulting cermet is not as likely to occur. Therefore, in this instance the powder may be added to the molten metal and blended by mechanical means to insure a reasonably homogeneous mixture with thorough wetting of the hard phase. In an instance such as this example where the density of the matrix metal is markedly higher than the density of the hard ceramic phase being included therein, it is necessary to use special techniques to prevent segregation due to density difference of the metal and the ceramic phase. A technique which has been found suitable for preventing the segregation during the cooling of the molten metal with the ceramic phase dispersed therein is a "drip-metal" technique. In this technique, a crucible containing the molten metal-ceramic particle phase is continuously agitated by mechanical means to insure a homogeneous distribution of the ceramic particles. At the base of the crucible, a small orifice is present which allows the agitated metal-hard phase material to pass through in a thin stream. This thin stream then impinges upon a cooling surface and quickly solidifies and thus prevents the particles from segregating. As more of the cermet material builds up beneath the crucible, the subsequent layers formed by the thin streams are actually bonded to the previously deposited material in a non-stratified mass. That is, the joining between the previously solidified phase and the phase resulting from a thin stream does not show a discontinuity. Products so formed may then be further worked to provide a desired shaped end product.

*Example II*

The alumina material of Example I may be employed to form cermet bodies in a slightly different fashion. In this connection, the copper-titanium matrix used in Example I is powdered to a particle size ranging below about 10 microns. To this powdered metal matrix the alumina refractory powder, which has been previously spheroidized, is added, the mixture being premixed and sintered to form a slug of material. The sintering process includes heating the composition to a temperature of within a few hundred degrees of the melting point or even just under the melting point for a period of time and then cooling to room temperature. A temperature of about 1900° F. for a period of 16 hours is satisfactory. Characteristics of this material are essentially the same as that prepared in accordance with Example I with the exception of higher porosity. Porosity is eliminated by subsequent mechanical working and annealing. The use of pressure during the sintering operation may also be advantageously employed to decrease the degree of porosity in the final product as well as to lower the necessary time and temperature requirements.

It will be appreciated that other matrix materials as well as other hard materials may be employed to prepare cermet bodies such as are described herein. Accordingly, it will be understood that there is no intention of limiting the scope of the present invention to the specific examples given above, since they are included for purposes of illustration only. Other modifications of the invention herein will be readily apparent to those skilled in the art.

We claim as our invention:

1. A cermet body consisting essentially of a metallic matrix containing dispersed, essentially spherical, refractory oxide particles; said particles ranging in size from greater than 1 micron up to about 50 microns in diameter and occupying from greater than 50 to about 95 volume percent of said body.

2. A cermet body consisting essentially of a metallic matrix containing dispersed, essentially spherical, alumina particles; said particles ranging in size from greater than 1 micron up to about 50 microns in diameter and occupying from greater than 50 to about 95 volume percent of said body.

References Cited in the file of this patent

UNITED STATES PATENTS

| | | |
|---|---|---|
| 2,553,714 | Lucas | May 22, 1951 |
| 2,698,990 | Conant et al. | Jan. 11, 1955 |
| 2,806,509 | Bozzacco et al. | Sept. 17, 1957 |
| 2,831,243 | Thomson | Apr. 22, 1958 |
| 2,949,358 | Alexander et al. | Aug. 16, 1960 |
| 2,972,529 | Alexander et al. | Feb. 21, 1961 |

FOREIGN PATENTS

| | | |
|---|---|---|
| 718,036 | Great Britain | Nov. 10, 1954 |